United States Patent Office 3,459,011
Patented Aug. 5, 1969

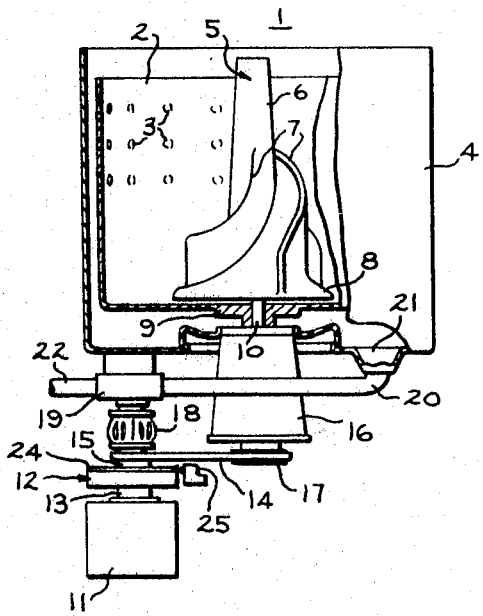
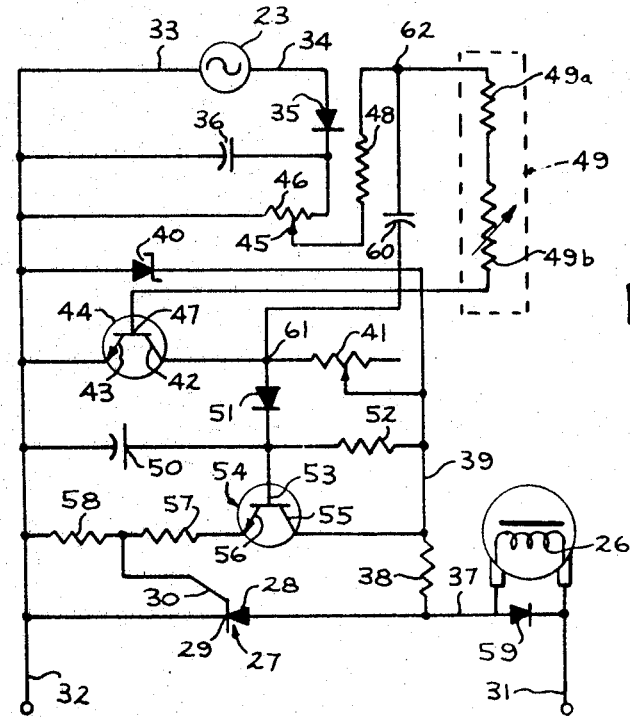

3,459,011
COMPENSATED CONTROL FOR ELECTRO-MAGNETIC CLUTCH
Robert M. Fey, Louisville, and Thomas W. Williams, Valley Station, Ky., assignors to General Electric Company, a corporation of New York
Filed Nov. 14, 1967, Ser. No. 682,781
Int. Cl. D06f 33/00, 29/00
U.S. Cl. 68—12                                7 Claims

ABSTRACT OF THE DISCLOSURE

A washing machine has an electromagnetic clutch with a semiconductor control means controlling the power to the clutch coil in response to a generated signal representative of the speed of the clutch output member. The signal generating means and the semiconductor control means are interconnected by amplifier circuit means and a capacitor is connected in a negative feedback relationship between the generating means and the amplifier circuit means.

BACKGROUND OF THE INVENTION

This is an improved control for an electromechanical clutch. Some aspects of the control illustrated but not claimed herein are described and claimed in copending application Ser. No. 682,777, filed concurrently herewith for Donald S. Heidtmann, and assigned to General Electric Company, assignee of the present invention.

Because of the drive systems used therein, some mechanisms like automatic washing machines have a mechanical resonance. For example, some washer transmissions have a certain amount of lost motion or "backlash" designed into them. Such mechanisms will tend to amplify the effect of any electrical ripple or resonance in a clutch control used therewith. This could result in substantial unwanted hunting or resonating of the washing machine in operation.

An object of this invention is to provide an improved electromechanical clutch control which minimizes the effect of any ripple in the electrical signal or any spurious signal.

Another object is to provide an improved electromagnetic clutch control in which negative feedback is provided to modify the clutch output speed responsive signal.

A further, more specific, object of this invention is to provide an electromagnetic clutch control having means to generate a signal responsive to the clutch output speed, semiconductor control means to control the power to the clutch coil and amplifier circuit means interconnecting the generating means and the control means; wherein negative feedback is provided to control the rate of amplification of the generated signal.

SUMMARY OF THE INVENTION

In an automatic washing machine having a rotatable container means to receive fluid and fabrics to be washed in the fluid, agitation means, and power means for actuating the agitation means and rotating the container means to cause washing of the fabrics and extracting of the fluid from the fabrics; an electromagnetic clutch is included and has a coil for varying the torque capability of the clutch in response to the average current passing through the coil.

There is provided a control circuit for connecting the coil to a source of electrical energy; including semiconductor control means connected in power supply relationship to the coil and generating means for producing a signal responsive to the output speed of the clutch. Amplifier circuit means interconnects the generating means and the semiconductor control means for applying a signal to the semiconductor control means which is responsive to the output speed of the clutch. A capacitor is connected in a negative feedback relationship between the amplifier circuit means and the generating means to control the rate of amplification of the generated signal.

BRIEF DESCRIPTION OF THE DRAWING

FIGURE 1 is a partial schematic front elevational view of a clothes washing machine adapted to utilize the new and improved control of this invention.

FIGURE 2 is a schematic electrical circuit diagram, illustrating one embodiment of the present invention.

DESCRIPTION OF THE PREFERRED EMBODIMENTS

Referring now to FIGURE 1 of the drawing, there is shown, in schematic form, an agitator-type washing machine adapted to utilize a new and improved control in accordance with the present invention, the machine being generally indicated by the numeral 1. Machine 1 includes a clothes basket 2 having perforations 3 over its side and bottom walls and disposed within an outer imperforate tub or casing 4, the basket 2 and tub 4 forming together fluid and clothes containing means. The entire structure generally is mounted within a suitable appearance and protective cabinet which, in this case, has been omitted for purposes of clarity. At the center of the basket 2 there is provided a vertical axis agitator 5 which includes a center post 6 and a plurality of curved vanes 7, extending out from the center post and connected together at their base by a flared skirt 8. Both the basket 2 and agitator 5 are movably mounted. Conventionally, the basket is mounted for rotation and the agitator is mounted for some type of oscillatory movement which will effect agitation of the fabrics and the fluid within the basket. In one conventional structure, the basket 2 may be secured to a hollow shaft 9, and the agitator may be secured to a shaft 10 which extends up within shaft 9 in rotatable relation thereto.

Basket 2 and agitator 5 are driven by a power means such as a reversible drive motor 11 through a drive including an electromagnetic clutch 12 mounted on the motor shaft 13. A suitable belt 14 transmits power from the output member 15 of the clutch to a transmission assembly 16 through a pulley 17. Thus, depending upon the direction of motor rotation, pulley 17 of transmission 16 is driven in opposite directions.

Transmission 16 is so arranged that it supports and drives both shafts 9 and 10. When motor 11 is operated in one direction, the transmission causes agitator 5 to be oscillated through shaft 10. Conversely, when the motor is driven in the opposite direction, the transmission drives basket 2 and agitator 5 together at high speed through shafts 9 and 10 for centrifugal extraction of fluid from the fabrics.

In addition to operating transmission 16 through clutch 12, as described, motor 11 also provides a direct drive through a flexible coupling 18 to a pump structure generally indicated at 19. Pump 19 has an inlet which is connected by a conduit 20 to an opening 21 formed in the lowermost portion of tub 4, and an outlet, which is connected by a conduit 22 to a suitable drain (not shown). When the motor 11 is rotated in the direction to cause the basket 2 and agitator 5 to be rotated for centrifugal fluid extraction, the pump 19 is effective to withdraw fluid from tub 4 through opening 21 and discharge it through conduit 22 to drain. When the motor is operated in the other direction, that is to cause agitator 5 to be oscillated for agitation of the fabrics within the fluid, the pump 19 is substantially ineffective.

In operation, the machine 1 is provided with an amount of water of suitable temperature through a conventional water supply mechanism (not shown). The motor 11 is then caused to rotate so as to result in agitator 5 being oscillated to cause fabrics in the machine to be agitated within the fluid. Thereafter the motor 11 is reversed so as to cause agitator 5 and basket 2 to be rotated at high speed for centrifugally extracting fluid from the fabrics. At the same time pump 19 is rotated so as to remove the vitiated fluid from the tub 4, and hence from the basket 2. This sequence of operation may be repeated a number of times; conventionally it is done at least three times to provide a prewash step, a wash step and a rinse step. The particular controls for providing such parameters as the number of steps, length of steps, variations in water temperature and automatic dispensing of such items as detergents, bleaches and rinse agents are quite conventional and form no part of the present invention. Therefore, they have been omitted for the sake of simplicity.

Referring now to FIGURES 1 and 2 there is shown, in schematic form, a new and improved control for the electromagnetic clutch 12. A suitable tachometer generator 23 is driven at a speed representative of the output speed of the clutch, thereby developing an electric potential or voltage which is representative of the angular velocity of the clutch output member 15. Preferably, the generator 23 is of the A.C., permanent-magnet, alternator type. In the particular machine illustrated in FIGURE 1 the generator includes a strip of magnetic material 24, which is mounted on the clutch output member and has alternate north and south poles, and a pickup 25 mounted adjacent the strip 24.

The cltch 12 includes a field coil 26 to vary the torque transmission capability or slippage of the clutch in response to the average current flow therethrough, as is common in electromagnetic clutches or coupling devices. By varying the current supply to the coil, the speed at which motor 11 will drive the agitator 5 and basket 2 may be controlled.

A controlled rectifier, preferably of the silicon controlled type, is shown at 27 and includes an anode 28, a cathode 29 and a gate 30. A pair of conductors 31 and 32 are provided to connect the coil 26 to a suitable source of pulsating electrical energy (not shown), for instance the usual 110–120 volt A.C. domestic power. The conductor 31 may be considered the power conductor and conductor 32 the neutral conductor. One side of the coil 26 is connected to the conductor 31 while the other side is connected to the conductor 32 in series with the anode 28 and cathode 29 of the controlled rectifier 27.

One terminal 33 of the tachometer generator 23 is connected to the neutral conductor 32 while the other terminal 34 is connected through a rectifier 35 and a filter capacitor 36 to the neutral conductor 32. Thus, a filtered D.C. voltage, representative of the A.C. voltage generated by tachometer 23 will appear across the capacitor 36.

In accordance with the present invention we provide a new and improved control circuit, including the controlled rectifier 27 and the tachometer generator 23 for controlling the current through coil 26. As stated above, one side of the coil 26 is connected to the conductor 31 while the other side is connected to a conductor 37 leading to the anode 28 of the controlled rectifier. The conductor 37 also is connected to one side of a dropping resistor 38, the other side of the resistor being connected by a conductor 39 to one side of a Zener diode 40. The other side of the Zener diode is connected to neutral conductor 32 so that the dropping resistor 38 and Zener diode 40 function together to provide a stable reference voltage for our new and improved control.

As part of the control we provide a voltage divider network including a variable resistance 41 and the collector 42 to emitter 43 path of a transistor 44. This voltage divider network is connected between conductor 39 and neutral conductor 32. The intermediate terminal 45 of a variable or trimming resistance 46, connected across filter capacitor 36, is connected to the base 47 of the transistor 44 through the series connection of a current limiting resistance 48 and a variable or control resistance 49 formed by a fixed resistor 49a and a variable resistor 49b. With the configuration of components as thus far described, it will be evident that the voltage produced by the tachometer generator 23 is used to control the conductivity of transistor 44. This in turn determines the percentage of the reference voltage which will appear across the collector to emitter path of the transistor.

A storage capacitor 50 is connected across the collector to emitter path of transistor 44 in series with a rectifier 51 and is connected to conductor 39 through a charging resistance 52. The voltage divider network formed by a resistance 41 and collector to emitter path of transistor 44, the capacitor 50, the rectifier 51, and the resistance 52 form a ramp and pedestal circuit. For each half cycle of applied voltage of proper polarity (with the circuit shown, when conductor 31 is positive with respect to conductor 32) the voltage divider quickly provides the capacitor 50 with a pedestal voltage, the value of which depends upon the conductivity of transistor 44. The capacitor 50 thereafter is charged to a higher value by a ramp voltage provided through charging resistance 52. The diode 51 isolates the capacitor 50 from the voltage divider network once the capacitor voltage reaches the collector to emitter voltage of the transistor. A more detailed explanation of the theory of operation of ramp and pedestal circuits is provided in the General Electric SCR Manual, third edition, section 8.4.2.

The juncture between capacitor 50 and charging resistance 51 is connected to the base 53 of a second transistor 54, having its collector 55 connected to conductor 39 and its emitter 56 connected to neutral conductor 32 through a pair of serially connected resistances 57 and 58. The gate 30 of the controlled rectifier 27 is connected to the juncture of the resistances 56 and 57.

It will be recognized that transistor 54 is connected in the circuit in an emitter follower configuration. With this connection, the transistor 54 will maintain an emitter voltage which is the same as the voltage of capacitor 50, less the nominal half volt drop from the base to the emitter within the transistor 54. The transistor conducts a sufficient collector to emitter current flow to maintain this voltage. When the voltage of capacitor 50 has reached some predetermined level, the collector to emitter current through transistor 54 will be sufficient to cause the controlled rectifier 27 to be gated so as to conduct current through the coil 36.

Assuming that the machine 1 is at rest and motor 11 is initially energized to drive the input member of clutch 12, initially the output member will not be turning and thus the tachometer generator 23 will be providing no voltage across capacitor 36. There will be no input signal to transistor 44 and the collector to emitter path thereof will exhibit an extremely high resistance. Therefore, during the half cycle when conductor 31 is positive with respect to conductor 32, most of the reference voltage between conductor 39 and conductor 32 will appear across, the collector to emitter path of transistor 44 and this reatively high voltage will be provided as a pedestal voltage to capacitor 50 through diode 51. The voltage on capacitor 50 is applied to the base 53 of the transistor 54 and causes a collector to emitter current to flow therethrough. Under normal conditions this current will be sufficient to gate the controlled rectifier 27. Thereafter, for the remainder of that half cycle of applied electrical energy, the controlled rectifier conducts from its anode to its cathode to provide a current through the clutch coil 26. As is usual in electromagnetic clutches this current through the clutch coil causes the input and output of the clutch to be coupled so that the ouput begins to rotate.

As the output member of the clutch rotates, causing the machine 1 to be operated, the tachometer 23 generates an ever increasing voltage. This causes an increasingly large voltage to appear across the capacitor 36. A portion of this voltage, determined by the setting of intermediate terminal 45 of the variable resistance 46 and the setting of control resistance 49, causes an increasing current to flow into the base 47 of the transistor. This means that on succeeding half cycles of proper polarity the collector 42 to emitter 43 portion of the voltage across the voltage divider network is a smaller and smaller portion of the reference voltage. This results in the pedestal voltage provided to the capacitor 50 being lowered so that an increasing ramp voltage must be added to provide a base voltage to transistor 54 sufficient to gate the controlled rectifier 57. In turn, this means that the controlled rectifier is gated increasingly later in each half cycle of proper polarity and less current is provided through the coil 26. Eventually an equilibrium condition is reached wherein the torque capability of the clutch provided by the current through the coil 26 is insufficient to cause any further acceleration of the clutch and thus any faster operation of the machine 1.

Since the controlled rectifier 27 will conduct in one direction only, energization of coil 26 from the usual domestic A.C. power source will cause the clutch always to be de-energized during one half of each cycle of applied power. In order to prevent erratic operation of the clutch because of this half wave power a rectifier 59 is connected across the coil 26 to act as a free wheeling diode and allow effective clutch operation from a half wave supply.

The control resistance 49 may be utilized to vary the current which is applied to the base of transistor 44 as a result of any particular voltage at terminal 45, so as to vary the platform voltage responsive to a particular output speed of the clutch. Since the transistor 44 acts as a current amplifier, passing a collector to emitter current which is a multiple of the base to emitter current, the variation of resistance 49 will vary the collector to emitter current through the transistor 44 and thus vary the percentage of the reference voltage applied to conductor 50. In practice, this variable resistance 49 conveniently may be used as a customer speed selection control. It will be understood that the variable resistance could be a single, variable resistor having a minimum value equal to the value of fixed resistor 49a and a maximum value equal to the value of 49a plus the maximum value of variable resistor 49b. Two resistors are shown as comprising the resistance 49 because it is less expensive to provide a fixed resistor and a resistor variable between 0 ohms and some upper limit than to provide a single resistor variable between some positive lower limit and an upper limit.

As an important aspect of this invention we provide a feedback capacitor 60 which is connected on one side to the junction 61 between resistance 41 and collector 47 and on the other side to the junction 62 between current limiting resistance 48 and control resistance 49. The capacitor 60 functions in two important ways. It will be recognized that the voltage or signal generating means (including the tachometer generator 23, the rectifier 35, and the filter capacitor 36) provides a D.C. voltage across the capacitor 36; however this voltage has an A.C. ripple. This A.C. ripple is picked up through the resistance 46 and is applied through resistances 48 and 49 to the base 47 of transistor 44. This tends to provide an undesirable ripple on the voltage at junction 61 of the voltage divider network. Assuming for descriptive purposes, that the ripple goes positive, it will cause a larger current to be provided to the base 47 of transistor 44 and thus a larger collector to emitter current to flow. This will try to reduce the voltage at junction 61; however, any reduction in the voltage at junction 61 will be fed back through the capacitor 60 to the junction 62 and then through the resistance 49 back into the base 47 of the transistor. This feedback opposes the original signal and tends to cut down the current flow into the base 47 to keep the voltage at junction 61 constant. This is called negative feedback and tends to compensate for any alternating current ripple in the generated signal.

The signal generated by tachometer 23 tends to maintain a constant D.C. voltage on the feedback capacitor 60. In each half cycle when conductor 31 is positive with respect to conductor 32 the capacitor 60 has a very high resistance discharge path through junction 61 until the controlled rectifier 27 is gated. Thereafter, for the remainder of that half cycle, the discharge path of capacitor 60 is somewhat lower and it will tend to discharge below the level at which the generated signal is attempting to maintain it. During the other half cycle, that is when conductor 31 is negative with respect to conductor 32, there is provided through the various components of the control circuit a discharge path for the capacitor 60. Thus, depending upon when in the proper half cycle controlled rectifier 27 is gated, the amount of discharge of capacitor 60 will vary; that is the earlier controlled rectifier 27 is gated the more capacitor 60 will discharge. Each time the conductor 31 goes positive with respect to conductor 32, the capacitor 60 will cause a modification of the signal into the transistor 44 so as to retard the rate at which the transistor 44 amplifies the signal of the voltage generator until the capacitor 60 has reached its normal voltage. Thus, if the controlled rectifier 27 has been fired too early in a particular half cycle the capacitor 60 will take longer to charge and retard the amplification by transistor 44 and necessitate a larger ramp voltage to gate controlled rectifier 27. By the same token, if the controlled rectifier fires unusually late in one cycle the retarding effect of capacitor 60 will be less the next cycle and the controlled rectifier will tend to be gated earlier. Such occasional erratic firings of the controlled rectifier can be caused by many things such as, for instance, surges across lines 31 and 32.

It will be understood that each time conductor 31 goes positive with respect to conductor 32, the voltage between conductors 39 and 32 builds toward the holding voltage of Zener diode 40, the voltage at junction 61 will also be building and will provide a signal through the capacitor 60 which will tend to lower the percentage of the applied voltage appearing across the collector to emitter path of the transistor 44. This characteristic of the circuit is essentially constant from cycle to cycle and the control is trimmed to provide for the desired response, taking into account this action of the feedback capacitor 60. In this regard resistances 41 and 46 are both shown as being variable and conventionally may be trim resistances.

Because of mechanical variations between individual clutches and slight differences in the characteristics of the elements of the generating means, the voltage across capacitor 36 for any given speed will tend to vary from unit to unit. The resistance 46 may be varied to provide the desired signal at terminal 45 for predetermined output speeds of a particular clutch regardless of mechanical variations in the particular clutch and slight differences of performance in the electrical elements used. In this regard resistance 48 is included to insure a high resistance path from capacitor 60 to conductor 32, even in the event that trim resistance 46 in a particular control is set to have a very low resistance between terminal 45 and conductor 32. Similarly the resistance 41 may be varied to calibrate the entire control, taking into account all of the other slight variations which will often occur from element to element.

We have found that a suitable control for a washing machine, for instance, can be obtained with the circuit of FIGURE 2 having the following values:

| Reference Numeral | Value or type number |
| --- | --- |
| 27 | General Electric No. C106B. |
| 35 | 1N5059. |
| 36 | 1 mf., 15 v. |
| 38 | 22K ohms. |
| 40 | 1N1771. |
| 41 | 10K ohms, variable. |
| 44 | 2N2926. |
| 46 | 10K ohms, variable. |
| 48 | 33K ohms. |
| 49a | 10K ohms. |
| 49b | 70K ohms maximum, variable. |
| 50 | 0.1 mf. |
| 51 | 1N5059. |
| 52 | 330K ohms. |
| 54 | 2N2926. |
| 57 | 1K ohm. |
| 58 | 470 ohms. |
| 59 | 1N5059. |
| 60 | 0.05 mf., 15 v. |

When operating at full speed the overall machine will be less sensitive to minor variations such as a ripple on the tachometer signal and surges in the A.C. line voltage than when the machine is operating at a sub speed. Therefore it is desirable to have the feedback more effective at sub speed settings. Our control provides this variation. From junction 62 the feedback signal has two paths to neutral conductor 32. The first path is through resistance 48 and that portion of resistance 46 between terminal 45 and conductor 32. Assuming a nominal midpoint setting for terminal 45 the total resistance for first path will be about 38K ohms. The second path is through the resistance 49 and the base to emitter path of transistor 44. For full speed operation resistor 49b will be at its maximum setting and there will be about 80K ohms from junction 62 to the base of the transistor 44. This means that most of the feedback signal will flow through resistances 48 and 46 to conductor 32 and the effect of the feedback will be minimized. For minimum speed operation resistor will be at its minimum setting, essentialy 0 ohms, and the path from junction 62 to the base of transistor will be about 10K ohms. Then most of the feedback signal will be applied to the transistor 44 and the effect of the feedback will be maximized.

It will be obvious to those skilled in the art that various modifications may be made herein without departing from the spirit of the invention. For instance, in many washing machines it is desired to drive the transmission at one speed for agitation and at another speed for an associated centrifugal extraction. This may be accomplished in the circuit illustrated merely by providing another variable resistance connected in parallel with the resistance 49 through a selector switch which would selectively connect junction 62 either to the resistance 49 or the other resistance. Many other modifications will be obvious to those skilled in the art and, while the foregoing is a description of the illustrative embodiments of the invention, it is our intention in the appended claims to cover all forms which fall within the scope of the invention.

What we claim as new and desired to secure by Letters Patent of the United States is:

1. In an automatic washing machine having a rotatable container to receive fluid and fabrics to be washed in the fluid, agitation means and power means for actuating the agitation means and rotating the container means to cause washing of the fabrics and extracting of the fluid from the fabrics, including an electromagnetic clutch having a coil for varying the troque capability of the clutch in response to the average current passing through said coil; a control circuit for connecting said coil to a source of electric energy, comprising:
   (a) semiconductor control means connected in power supply relationship to said coil;
   (b) generating means for producing a signal responsive to the output speed of said clutch;
   (c) amplifier circuit means interconnecting said generating means and said semiconductor control means for applying a signal to said control means which is responsive to the output speed of said clutch; and
   (d) a capacitor connected in a negative feedback relationship between said generating means and said amplifier circuit means to control the rate of amplification of said generated signal, so that the average current through said coil is responsive to the average signal of said generating means.

2. In an automatic washing machine having a rotatable container to receive fluid and fabrics to be washed in the fluid, agitation means and power means for actuating the agitation means and rotating the container means to cause washing of the fabrics and extracting of the fluid from the fabrics, including an electromagnetic clutch having a coil for varying the torque capability of the clutch in response to the average current passing through said coil; a control circuit for connecting said coil to a source of pulsating electric energy, comprising:
   (a) semiconductor switch means connected in said circuit in power supply relationship to said coil;
   (b) generating means for producing a signal responsive to the output speed of said clutch;
   (c) amplifier circuit means interconnecting said generating means and said semiconductor switch means for applying a signal to said switch means which is responsive to the output speed of said clutch, said amplifier circuit means including voltage regulating means for providing a half wave reference voltage of predetermined maximum value; and
   (d) a capacitor connected in a negative feedback relationship between said generating means and said amplifier circuit means to control the rate of response of said amplifier circuit means, so that the average current through said coil is responsive to the average signal of said generating means.

3. The invention as set forth in claim 2 wherein said amplifier circuit means is of the ramp and pedestal type and said feedback capacitor controls the rate at which the pedestal voltage is reached.

4. In an automatic washing machine having a rotatable container to receive fluid and fabrics to be washed in the fluid, agitation means and power means for actuating the agitation means and rotating the container means to cause washing of the fabrics and extracting of the fluid from the fabrics, including an electromagnetic clutch having a coil for varying the torque capability of the clutch in response to the average current passing through said coil; a control circuit for connecting said coil to a source of pulsating electric energy, comprising:
   (a) semiconductor switch means connected in said circuit in power supply relationship to said coil;
   (b) rectifier means connected in said circuit to provide said circuit with a pulsed unidirectional reference voltage of predetermined maximum value;
   (c) a voltage divider network connected in said circuit to be energized by said reference voltage and including the collector to emitter path of a transistor;

(d) generating means for producing a signal responsive to the output speed of said clutch for application to the base of said transistor to provide a collector to emitter voltage across said transistor representative of said output speed;

(e) a storage capacitor connected in said circuit so as to be provided with a pedestal voltage responsive to said collector to emitter voltage and a ramp voltage above said pedestal voltage;

(f) semiconductor means interconnecting said storage capacitor and said semiconductor switch means to gate said semiconductor switch means and provide energy to said coil in response to the voltage across said storage capacitor reaching a predetermined value; and voltage divider and said generating means to control the rate of response of said transistor, so that the average current through said coil is responsive to the average signal of said generating means.

5. The invention as set forth in claim 4 wherein said negative feedback means includes a feedback capacitor connected in circuit between the collector and the base of said transistor.

6. The invention as set forth in claim 5 wherein said base of said transistor is connected to said generating means through an adjustable resistance to vary the signal applied to said base in response to any particular clutch output speed.

7. The invention as set forth in claim 4 wherein the base of said transistor is connected to said generating means in series with an adjustable resistance for varying the current provided to said base in response to any particular clutch output speed and wherein said feedback means includes a feedback capacitor connected between said voltage divider network, on the collector side of said transistor, and the generating means side of said adjustable resistance.

References Cited

UNITED STATES PATENTS

| 3,328,983 | 7/1967 | Brucken et al. | 68—12 |
| 3,403,538 | 10/1968 | Andrew et al. | 68—12 |

ROBERT L. BLEUTGE, Primary Examiner

U.S. Cl. X.R.

68—23

PO-1050
(5/69)

UNITED STATES PATENT OFFICE
CERTIFICATE OF CORRECTION

Patent No. 3,459,011                    Dated August 5, 1969

Inventor(s)    R. M. Fey et al

It is certified that error appears in the above-identified patent and that said Letters Patent are hereby corrected as shown below:

Column 9, line 16, reading "voltage divider and said generating means to control" should read - (g) negative feedback means connected between said voltage divider and said generating means to control -

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents